United States Patent [19]
Park et al.

[11] Patent Number: 5,892,339
[45] Date of Patent: Apr. 6, 1999

[54] THREE-PHASE BRUSHLESS DC MOTOR DRIVING CIRCUITS AND METHODS USING ONE HALL SIGNAL

[75] Inventors: Shi-Hong Park; Yun-Kee Lee, both of Seoul, Rep. of Korea

[73] Assignee: Samsung Electronics Co., Ltd., Suwon, Rep. of Korea

[21] Appl. No.: 922,789

[22] Filed: Sep. 2, 1997

[30] Foreign Application Priority Data

Sep. 2, 1996 [KR] Rep. of Korea ................... 96-37803
Nov. 20, 1996 [KR] Rep. of Korea ................... 96-55802
Aug. 19, 1997 [KR] Rep. of Korea ................... 97-39318

[51] Int. Cl.$^6$ .................................................... G05B 1/06
[52] U.S. Cl. ........................................... 318/254; 318/653
[58] Field of Search ................... 318/254, 439, 318/138, 653; 73/514.31, DIG. 3; 324/207.2; 330/6

[56] References Cited

U.S. PATENT DOCUMENTS

| | | | |
|---|---|---|---|
| 4,622,499 | 11/1986 | Squires et al. | 318/254 |
| 4,882,523 | 11/1989 | Denzlingen | 318/254 |
| 5,041,769 | 8/1991 | Iwai | 318/254 |
| 5,256,923 | 10/1993 | Bartos et al. | 310/166 |
| 5,300,883 | 4/1994 | Richeson | 324/207.22 |
| 5,414,338 | 5/1995 | Gleim | 318/562 |
| 5,523,679 | 6/1996 | Kalb | 324/165 |
| 5,767,639 | 6/1998 | Sakaguchi et al. | 318/254 |

*Primary Examiner*—Brian Sircus
*Attorney, Agent, or Firm*—Myers Bigel Sibley & Sajovec

[57] ABSTRACT

A three-phase brushless dc motor driving circuit can use only one Hall signal. The magnitude and phase of the Hall signal is used for commutation in order to perform soft switching, and an index marker circuit can determine the starting point of motor rotation. A clock signal is output at extreme points of the Hall signal generated by the Hall sensor. Based on the clock signal, three step voltage signals are generated, each step voltage signal having three voltage levels, signal periods three times that of the Hall signal and 120 and 240 degree phase differences with the other two step voltage signals. The direction of current flow in each stator coil is controlled based on the voltage difference each of the step voltage signals and the Hall signal. Index marker detection is performed by demagnetizing a portion of a magnet in a rotor of the motor and using an additional extreme point resulting in the Hall signal to output an index marker.

28 Claims, 12 Drawing Sheets

FIG.7
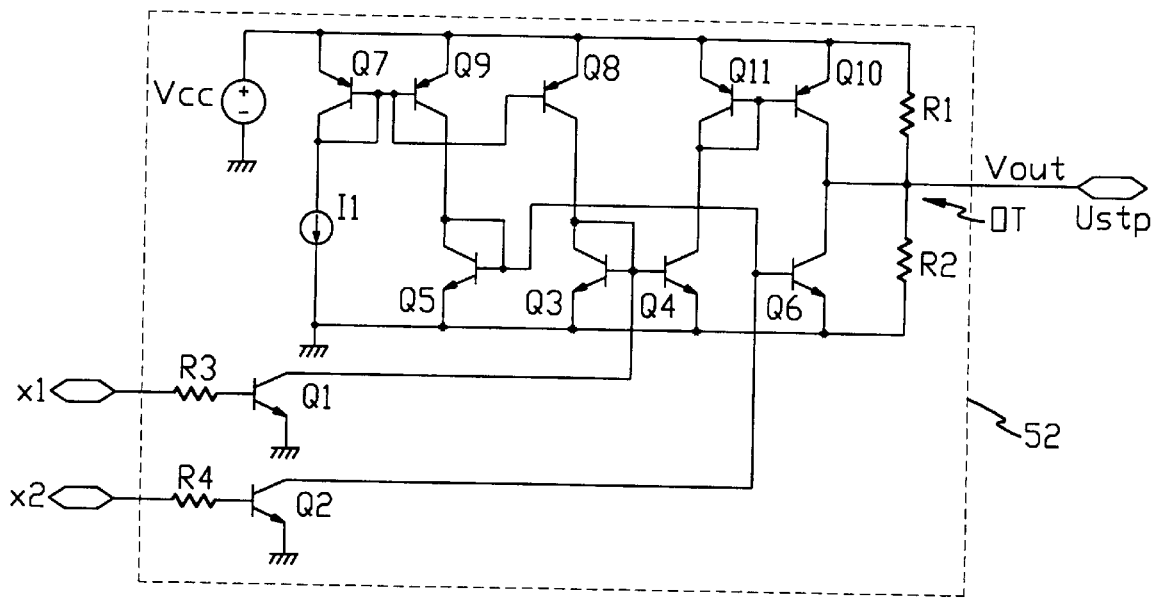
FIG.8A
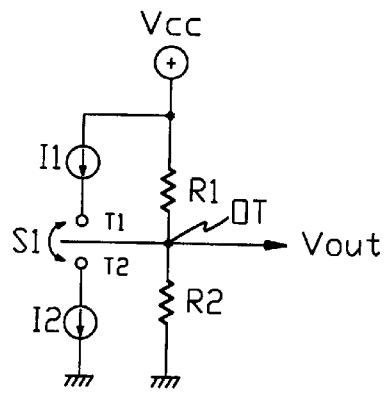
FIG.8B
| x1 | x2 | S1 |
|----|----|----|
| H | H | Open |
| L | H | Shorted to T1 |
| H | L | Shorted to T2 |

THREE-PHASE BRUSHLESS DC MOTOR DRIVING CIRCUITS AND METHODS USING ONE HALL SIGNAL

FIELD OF THE INVENTION

The present invention relates to motor driving circuits and methods, and more particularly to driving circuits and methods for three-phase brushless dc motors.

BACKGROUND OF THE INVENTION

A three-phase brushless dc motor can typically be thought of as having a stator with three coils, U-phase, V-phase, and W-phase, and a rotor with permanent magnets. As shown in FIG. 1, the permanent magnets comprise a main magnet 10 which has repeatedly alternating North and South magnetic poles for providing the necessary torque for motor rotation and a sub-magnet 12 which has repeatedly alternating North and South magnetic poles, for controlling motor speed. The ratio of the magnetic poles with respect to the main magnet and the sub-magnet preferably is 1 to 3.

The three-phase brushless dc motor enables motor rotation by sending currents through the coils which create a magnetic field which in turn generates a torque for motor rotation. In order to maintain the rotation in one direction, magnetic fields of the rotor are detected with Hall sensors, resolvers, or photo-encoders and then the direction of electric current flowing in each stator coil is changed based on the intensity of the detected magnetic fields. This changing of direction of electric current flow is called commutation.

Also in FIG. 1, Hall signals detected from the magnets by Hall sensors during motor rotation are shown. The Hall signals are periodic sine waves expressing the magnetic field intensity of the main magnet 10 and sub-magnet 12. The Hall signal of the main magnet 10 is expressed as HM, and the Hall signal of the sub-magnet 12 is expressed as HS.

A Hall sensor outputs original Hall signals ("positive Hall signals") and signals with 180 degree phase difference ("negative Hall signals") to the positive Hall signals. It should be noted that only positive Hall signals are shown in FIG. 1. The Hall signals HM of the main magnet 10 ("main Hall signals") and the Hall signal HS of the sub-magnet 12 ("sub-magnet Hall signals") have a period ratio of one to three since the ratio of magnetic polarities of the main magnet 10 and the sub-magnet 20 is assumed to be one to three.

Generally, a three-phase brushless dc motor with three Hall sensors has been used to obtain three Hall signals in order to produce proper commutation of currents in the stator coils. A modification to the above brushless dc motor, i.e., a three-phase brushless dc motor with one Hall sensor, was introduced. However, under this technique, the commutation is done based on the phase of Hall signals irrespective of its magnitude (voltage value). As a result, sparks may occur during the switching process for commutation which can increase electromagnetic interference. Snubbers are used to prevent sparks.

Therefore, a preferred three-phase brushless dc motor still is a motor with three Hall sensors to generate three main Hall signals, each signal having 120 degree and 240 degree phase differences with respect to other two signals. This is done in order to take into account of both magnitude and phase of the Hall signals in performing commutation.

A driving circuit for motors using three Hall signals is shown in FIG. 2. The driving circuit comprises three emitter coupled pairs 20, 22 and 24; a stator 28 having U-phase coil, V-phase coil and W-phase coil; and an inverter 26. The inverter 26 controls current direction in each coil of the stator 28 by sequentially turning on and off its switches which is connected to the stator 28, based on currents Ic1–Ic6 flowing through the output terminals of the emitter coupled pairs 20, 22 and 24.

The three emitter coupled pairs 20, 22 and 24 all have identical structure, so the structure of emitter coupled pair 20 will now be explained as an example. The emitter coupled pair 20 has two npn type transistors P1 and P2. The emitters of the transistors P1 and P2 are connected to a common node; the base of the transistor P1 and the base of the transistor P2 receive a positive Hall signal HM1+ and a negative Hall signal HM1−, respectively; and the collector of the transistor P1 and the collector of the transistor P2 receive the current Ic1 and the current Ic2, respectively. A current source IEE1 is inserted between ground and the emitter.

The voltage difference of the positive main Hall signal HM1+ and the negative main Hall signal HM1− being applied to the bases of the emitter coupled pair 20 determines amount of the currents Ic1 and Ic2 flowing through the collectors of the transistors P1 and P2. The current flow amount in other two emitter coupled pairs 22 and 24 are determined similarly by the voltage difference of the positive main Hall signal HM+ and the negative main Hall signal HM−.

A first, a second, and a third Hall voltage difference signals VHU, VHV and VHW of the positive and the negative Hall signals are shown in FIG. 3. For example, the first Hall voltage difference signal VHU is voltage difference of the first positive main Hall signal HM1+ and the first negative main Hall signal HM1−. The first, the second and the third Hall voltages differences VHU, VHV and VHW, each have a phase difference of 120 degrees and 240 degrees with the other two signals.

The currents Ic1–Ic6 of emitter coupled pairs 20, 22, and 24 increase or decrease linearly within section A. As shown in FIG. 3, section A refers to sections where the first, the second and the third Hall voltage differences VHU, VHV and VHW are within positive 50 mV to negative 50 mV with respect to the Hall bias voltage, i.e., within 100 mV with respect to the Hall bias voltage, which is about four times the thermal voltage. In other words, section A refers to sections where the voltage differences of positive main Hall signals to its negative main Hall signals are within positive 50 mV to negative 50 mV with respect to the Hall bias voltage.

In areas outside of the section A, i.e., in section B, the currents Ic1–Ic6 do not increase or decrease linearly due to the current sources IEE1–IEE3. Therefore, internal switches of the inverter 26 are turned on or off. Current directions of the stator coils are changed in the section A so commutation occurs therein. The section B corresponds to the period when commutation has been completed.

In this way, commutation is done only in the section A so soft switching is made possible by using the currents Ic1–Ic6 which are varied based on both phase and magnitude of Hall signals. Soft switching has advantages of reducing sparks during commutation. However, for soft switching, the conventional technique uses three Hall sensors which can result in increases in size and cost of driving circuit.

In video cassette recorders, floppy disk drives, and other devices which read or write data by using a motor driven at a constant speed, it is often desired to determine the starting point of motor rotation in order to read or write data without errors. Conventionally, additional mechanical elements are determine the starting point of motor rotation, i.e., an index marker. The stator additionally includes a covering cap, a protrusion on the cap, and a sensor for detecting the protrusion on each revolution of the stator and sending out an index marker per revolution of the stator. A technique using this method is described in Korean Patent Application No. 96-55802.

SUMMARY OF THE INVENTION

The present invention is directed to three-phase brushless dc motor driving circuits and methods that can use only one Hall signal to perform soft switching, and that can use circuits to detect an index marker without the need for additional mechanical elements.

In an embodiment of the present invention, three-phase brushless dc motor driving circuits and methods that can use one Hall signal to perform soft switching, include a Hall sensor which generates a Hall signal based on the magnetic field strength on a rotor magnet. An extreme point detector outputs an extreme point signal based on extreme points of the Hall signal. A step voltage generator outputs three step voltage signals from the extreme point signal. Each step voltage signal includes a signal period which is three times that of the Hall signal and has 120 and 240 degree phase differences with the other two step voltage signals. A commutator controls the current direction in each of the stator coils based on the voltage differences between each of three step voltage signals and the Hall signal, respectively.

Although one Hall signal may be used in the above circuits and methods, the effect of using three Hall signals may be obtained by using three step voltage signals. Soft switching may be allowed in sections where the voltage difference between the step voltage signals and the Hall signal are within positive and negative 50 mV of the Hall bias voltage.

In another aspect of the present invention, three-phase brushless dc motor driving circuits and methods include circuits for detecting an index marker. An absolute value circuit generates an absolute value signal of the Hall signal. An extreme point detector outputs an extreme point signal based on extreme points of the absolute value signal. An index marker generator generates an index marker based on the extreme point signal.

The index marker detecting circuits can use a sub-magnet in a rotor, having a slightly demagnetized portion, which causes two extreme points to appear in the corresponding half period of the Hall signal where only one extreme point exists in other half periods of the Hall signal. One of the two extreme points is used as a clock signal and the other is used to output an index marker. In this way, an index marker can be output for each revolution of the rotor.

The single Hall sensor circuits and index marker circuits may be used individually or in combination. Associated methods are also provided.

BRIEF DESCRIPTION OF DRAWINGS

FIG. 7 is a circuit diagram of the first switching means in FIG. 5;

FIG. 8A is an equivalent circuit diagram of the first switching means in FIG. 7;

FIG. 8B is a truth table of the first switching means in FIG. 7;

DETAILED DESCRIPTION OF THE PREFERRED EMBODIMENT

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
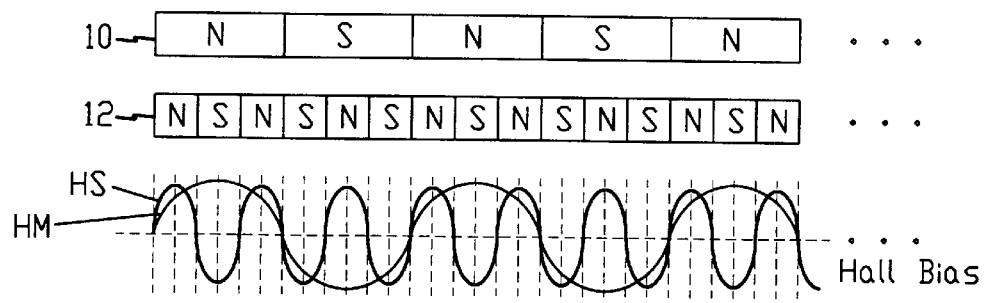
FIG. 1 shows a main magnet and sub-magnet attached to a rotor in a conventional three-phase brushless dc motor, and Hall signals detected on the main magnet and the sub-magnet during motor rotation.
Figure 2:
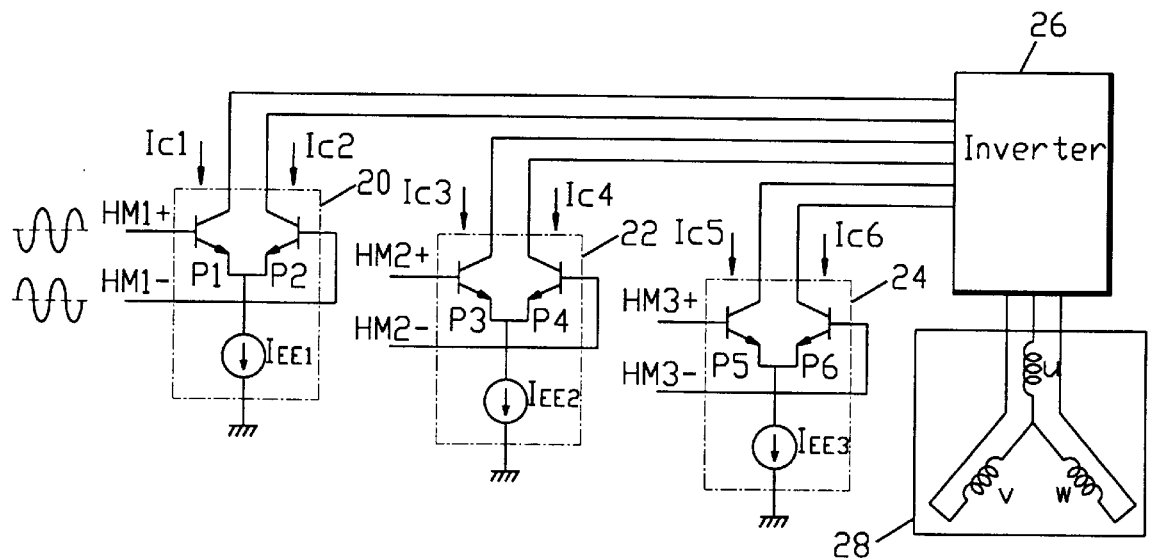
FIG. 2 is a driving circuit diagram of a conventional three-phase brushless dc motor using three Hall sensors for detecting the magnetic field of the main magnet.
Figure 3:
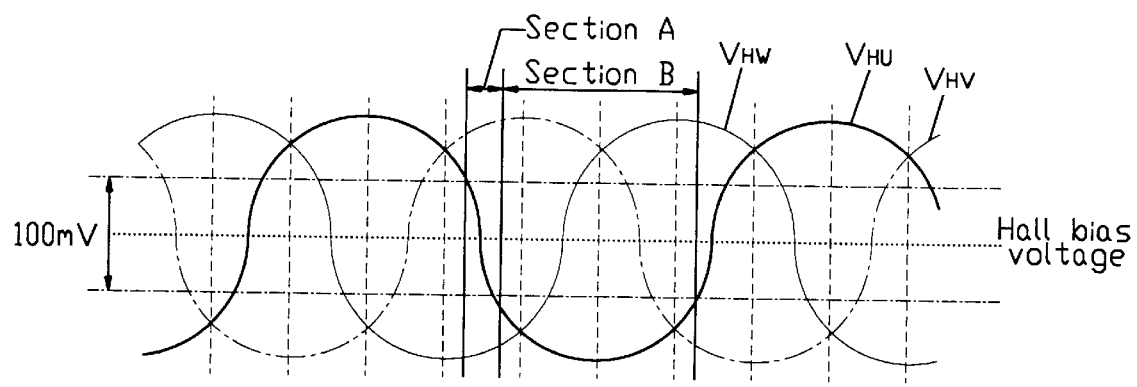
FIG. 3 shows Hall voltage differences between positive main-magnet Hall signals and negative main-magnet Hall signals.
Figure 4:
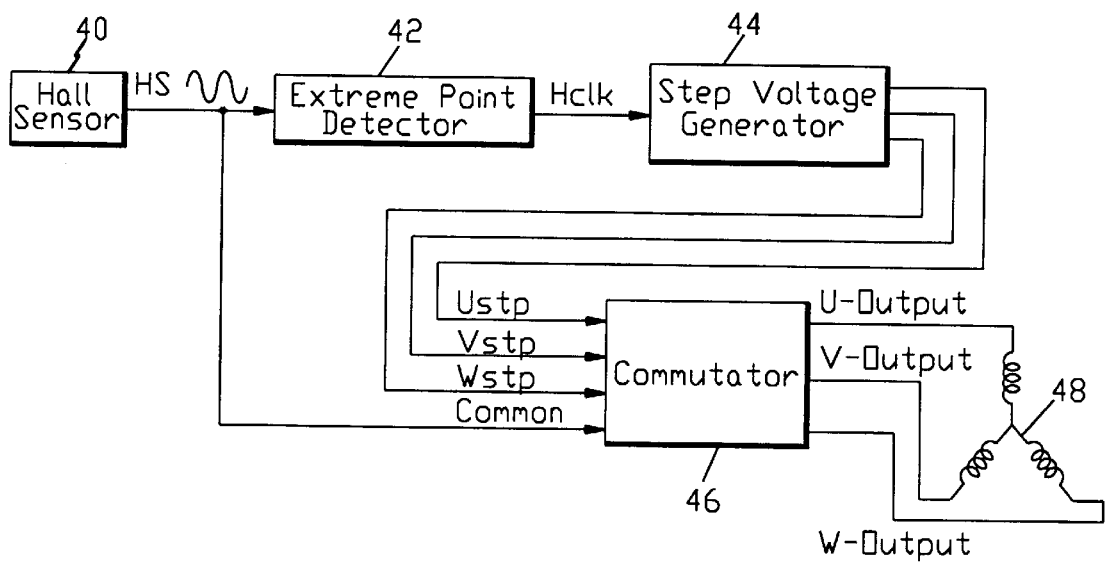
FIG. 4 is a block diagram of three-phase brushless dc motor driving circuits that can use one Hall signal for detecting the magnetic field of the sub-magnet according to an embodiment of the present invention.

A block diagram of three-phase brushless dc motor driving circuits and methods that can use one Hall signal according to an embodiment of the present invention is shown in FIG. 4. An extreme point detector 42 sends out a clock signal Hclk, also referred to as an extreme point signal, at maximum and minimum points of the sub-magnet Hall signal HS received from a Hall sensor 40.

A step voltage generator 44 receives the clock signal Hclk and generates three step voltage signals of Ustp, Vstp and Wstp. Each of the step voltage signals Ustp, Vstp and Wstp has three voltage levels of standard voltage, above-standard voltage, and below-standard voltage and has a period three times that of the sub-magnet Hall signal HS. Each of the step voltage signals also has phase differences of 120 and 240 degrees with the other two step voltage signals. That is, Ustp precedes 120 degrees ahead of Vstp and 240 degrees ahead of Wstp. The standard voltage refers to dc bias voltage of Hall signal, i.e., the Hall bias voltage.

Figure 5:
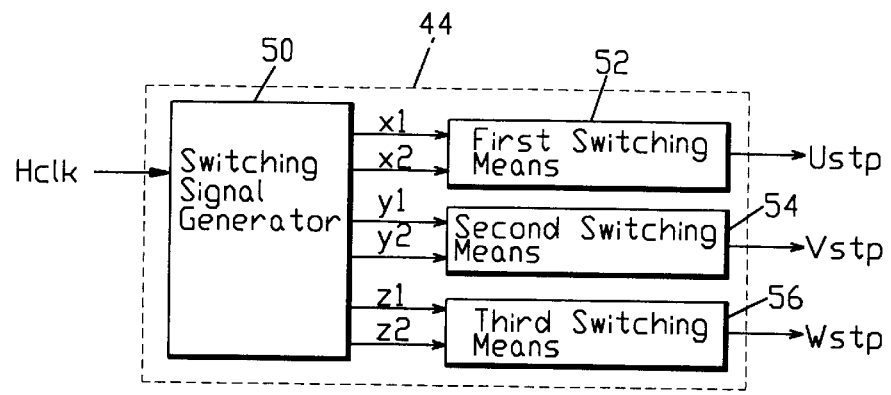
FIG. 5 is a block diagram of the step voltage generator in FIG. 4.

As shown in FIG. 5, the step voltage generator 44 comprises a switching signal generator 50 and a first, a second and a third switching means 52, 54 and 56. Preferably, each switching means has identical structure.

The operation of the step voltage generator 44 may be separated into two main operations. First, the switch signal generator 50 sends out a signal x1 which remains high for four clock cycles and changes to low for two clock cycles. It also generates a signal x2, which has a phase difference of 180 degrees with the signal x1. The signal x1 and the signal x2 form a first signal pair. In addition, the switch signal generator 50 generates a second signal pair y1 and y2 and a third signal pair z1 and z2, each signal pair being identical to the other two pairs except for phase difference. That is, the first signal pair x1 and x2 precedes the second signal pair y1 and y2 and the third signal pair z1 and z2 by 120 degrees and 240 degrees, respectively.

Second, the first switching means 52, the second switching means 54 and the third switching means 56 receive the first signal pair x1 and x2, the second signal pair y1 and y2 and the third signal pair z1 and z2, and then output a first, a second, and a third step voltage signal Ustp, Vstp and Wstp, respectively. Each of the step voltage signals Ustp, Vstp and Wstp maintains above-standard voltage for two clock cycles, standard voltage for one clock cycle, below-standard voltage for two clock cycles, and standard voltage for one clock cycle and has phase differences of 120 and 240 degrees with the other two signals.

Figure 6:
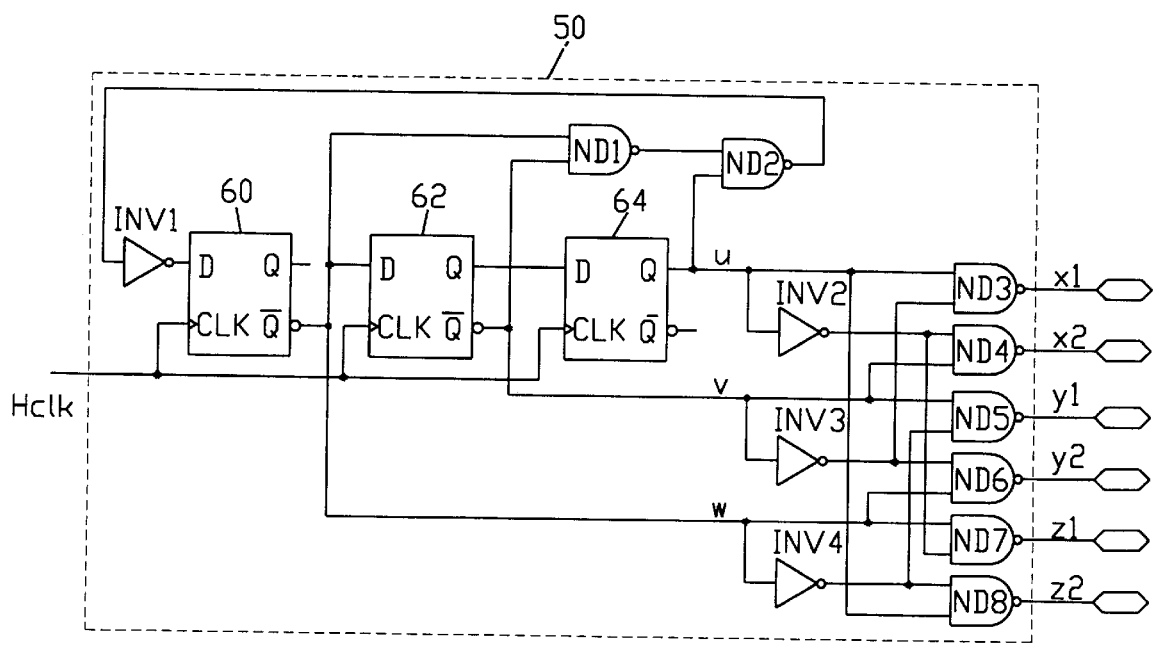
FIG. 6 is a circuit diagram of the switch signal generator in FIG. 5.

In order to explain the above operation more fully, a circuit diagram of the switching signal generator 50 is shown in FIG. 6. The switching signal generator 50 comprises a first, a second and a third D flip-flop 60, 62 and 64 which all receive the clock signal Hclk; a plurality of NOT gates (inverters) INV1–INV4; and a plurality of NAND gates ND1–ND8.

The first D flip-flop 60 receives the output of the first NOT gate INV1, the second D flip-flop 62 receives the inverse output of the first D flip-flop 60, and the third D flip-flop 64 receives the output of the second D flip-flop 62. The first NAND gate ND1 receives and NANDs the inverse outputs of the first and the second D flip-flops 60 and 62. The second NAND gate ND2 receives and NANDs the outputs of the first NAND gate ND1 and the third D flip-flop 64. The first NOT gate INV1 receives the output of the second NAND gate ND2 and outputs to the first D flip-flop 60 as mentioned above.

The output of the third D flip-flop 64 and the inverse outputs of the second and the first D flip-flop 62 and 60 become a first phase, a second phase, and a third phase clock signal u, v and w. Each of the phase clock signals u, v and w has a signal period six times that of the common clock signal Hclk and has 120 and 240 degree phase differences with the other two phase clock signals.

The three phase clock signals u, v and w are input to a plurality of NOT gates and a plurality of NAND gates. The second, the third and the fourth NOT gates INV2~INV4 receive and inverse the first, the second, and the third phase clock signals u, v and w, respectively.

The third NAND gate ND3 receives the first phase clock signal u and the inverse of second phase clock signal v', i.e., the output of the third NOT gate INV3, and generates the signal x1. The fourth NAND gate ND4 receives the second phase clock signal v and the inverse of first phase clock signal u', i.e., the output of the second NOT gate INV2, and generates the signal x2. Thus, the first signal pair x1 and x2 is formed.

The fifth NAND gate ND5 receives the second phase clock signal v and the inverse of third phase signal w', i.e., the output of the fourth NOT gate INV4, and generates the signal y1. The sixth NAND gate ND6 receives the third phase clock signal w and the inverse of second phase clock signal v', i.e., the output of the third NOT gate INV3, and generates the signal y2. Thus, the second signal pair y1 and y2 is formed.

The seventh NAND gate ND7 receives the third phase clock signal w and the inverse of first phase clock signal u', i.e., the output of the second NOT gate INV2, and generates the signal z1. The eighth NAND gate ND8 receives the first phase clock signal u and the inverse of third phase clock signal w', i.e., the output of the fourth NOT gate INV4, and generates the signal z2. Thus, the third signal pair z1 and z2 is formed.

Next as an illustrative example of the three switching means 52, 54 and 56, a circuit diagram of the first switching means 52 of the step voltage generator 44 is shown in FIG. 7. The first switching means 52 comprises six npn transistors as first to sixth transistors Q1–Q6, five pnp transistors as seventh to eleventh transistors Q7–Q11, a current source I1, a voltage source Vcc, four resistors R1–R4, and a voltage output terminal OT.

More specifically, with respect to the npn transistors, the bases of the first and the second transistors Q1 and Q2 receive the first signal pair x1 and x2, and their emitters are grounded. The emitter of the third transistor Q3 is grounded, and its base and collector are connected to the collector of the first transistor Q1. The base and emitter of the fourth transistor Q4 are connected in common, respectively, to the base and emitter of the third transistor Q3. The emitter of the fifth transistor Q5 is grounded, and its base and collector are connected to the collector of the second transistor Q2. The base and emitter of the sixth transistor Q6 are connected in common, respectively, to the base and emitter of the fifth transistor Q5.

With respect to the pnp transistor, the emitter of the seventh transistor Q7 is connected to the voltage source Vcc, and its base and collector are connected to each other. The base of the eighth transistor Q8 is connected in common to the base of the seventh transistor Q7, and its collector is connected in common to the collector of the third transistor Q3, and its emitter is connected in common to the emitter of the seventh transistor Q7. The base of the ninth transistor Q9 is connected in common to the bases of the seventh transistor Q7 and the eighth transistor Q8, and its collector is connected in common to the collector of the fifth transistor Q5, and its emitter is connected in common to the emitter of the seventh transistor Q7. The collector of the tenth transistor Q10 is connected in common to the collector of the sixth transistor Q6, and its emitter is connected in common to the emitter of the seventh transistor Q7. The base of the eleventh transistor Q11 is connected in common to the base of the tenth transistor Q10, and its collector is connected in common to the fourth transistor Q4, and its emitter is connected in common to the emitter of the seventh transistor Q7.

The current source I1 is inserted between the collector of the seventh transistor Q7 and ground. The first resistor R1 is in parallel to the tenth transistor Q10 and has one end connected to the common node to the emitter of the tenth transistor Q10. The second resistor R2, having the same resistance as the first resistor R1, is in parallel to the sixth transistor Q6 and has one end connected to the common node to the emitter of the sixth transistor Q6. The voltage output terminal OT is connected to the common node to the collectors of the sixth and the tenth transistors Q6 and Q10 and is connected between the first and the second resistors R1 and R2.

As may be understood from above, the third and the fourth transistors Q3 and Q4, the fifth and the sixth transistors Q5 and Q6, the seventh and the ninth transistors Q7 and Q9, and the tenth and the eleventh transistors Q10 and Q11, respectively form current mirrors.

Operation of the first switching means 52 may be better understood using an equivalent circuit thereof shown in FIG. 8A. The equivalent circuit comprises a voltage source Vcc, a first current source I1, a second current source I2, and a threeway switch S1, a first resistor R1, a second resistor R2, and a voltage output terminal Vout. One end of the first current source I1 is connected to the voltage source Vcc and the other end is connected to a first terminal T1 of the three-way switch S1. One end of the second current source I2, having the same ampere output as the first current source I1, is connected to a second terminal T2 of the three-way switch and other end of the second current source I2 is grounded. One end of the first resistor R1 shares a common node with one end of the first current source I1 which is connected to the voltage source Vcc. The second resistor R2, having the same resistance as the first resistor R1, is connected in series with the first resistor R1 and is grounded in the other end. The voltage output terminal OT is connected to a node between the first resistor R1 and the second resistor R2 and has an extension which is placed between the first and the second terminals T1 and T2 of the three-way switch S1 not touching either terminals.

Referring to the equivalent circuit above and the truth table in FIG. 8B, operation of the first switching means 52 is explained below. When the first signal pair x1 and x2 are both high, the first transistor Q1 and the second transistor Q2 are turned on. This corresponds to the state when the equivalent circuit has the three-way switch S1 in open state. Therefore, the output voltage Vout is Vcc/2, also referred to as the standard voltage.

When the first signal pair x1 and x2 are low and high, respectively, the first transistor Q1 is turned off and the second transistor Q2 is turned on so the fifth and the sixth transistors Q5 and Q6 are turned off and the current of the current source I1 flows through the tenth transistor Q10. This corresponds to the state when the equivalent circuit has the three-way switch S1 shorted to the first terminal T1. Therefore, the output voltage Vcc is (Vcc+I1·R1)/2, also referred to as the above-standard voltage.

When the first signal pair x1 and x2 are high and low, respectively, the first transistor Q1 is turned on, and the second transistor Q2 is turned off so the third and the fourth transistors Q3 and Q4 are turned off and the current of the current source I1 flows through the sixth transistor Q6. This corresponds to the state when the equivalent circuit has the three-way switch S1 shorted to the second terminal T2. Therefore, the output voltage Vcc is (Vcc−I1·R1)/2, also referred to as the below-standard voltage.

Figure 9:
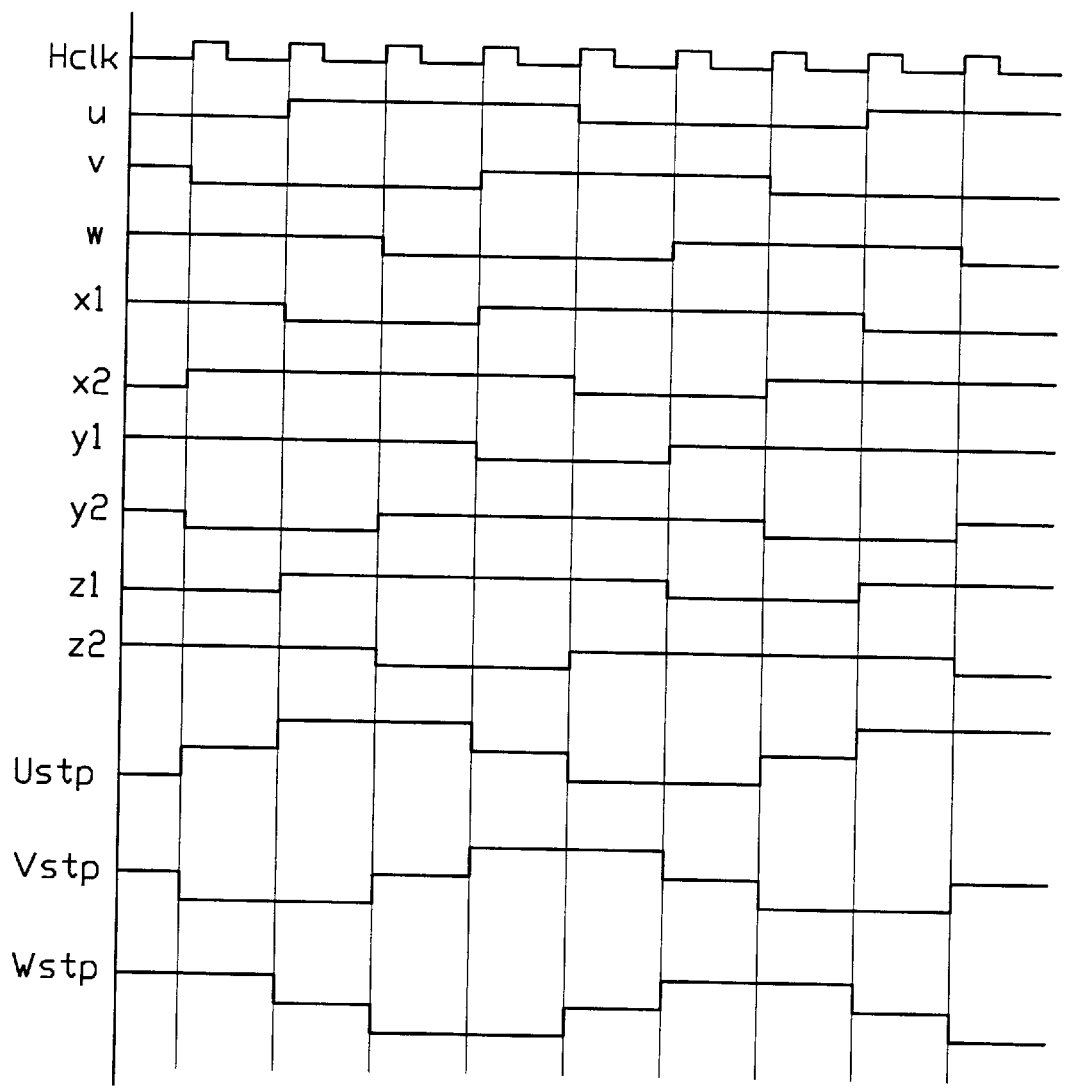
FIG. 9 shows signals generated and outputted by the step voltage generator in FIG. 4.

Accordingly, the first switching means 52 generates the first step voltage signal Ustp. Similarly, the second and the third switching means 54 and 56 generate the second and the third step voltage signal Vstp and Wstp, respectively. FIG. 9 shows the three step voltage signals Ustp, Vstp and Wstp as well as the signals of the step voltage generator 44 involved in generating the step voltage signals.

Figure 10:
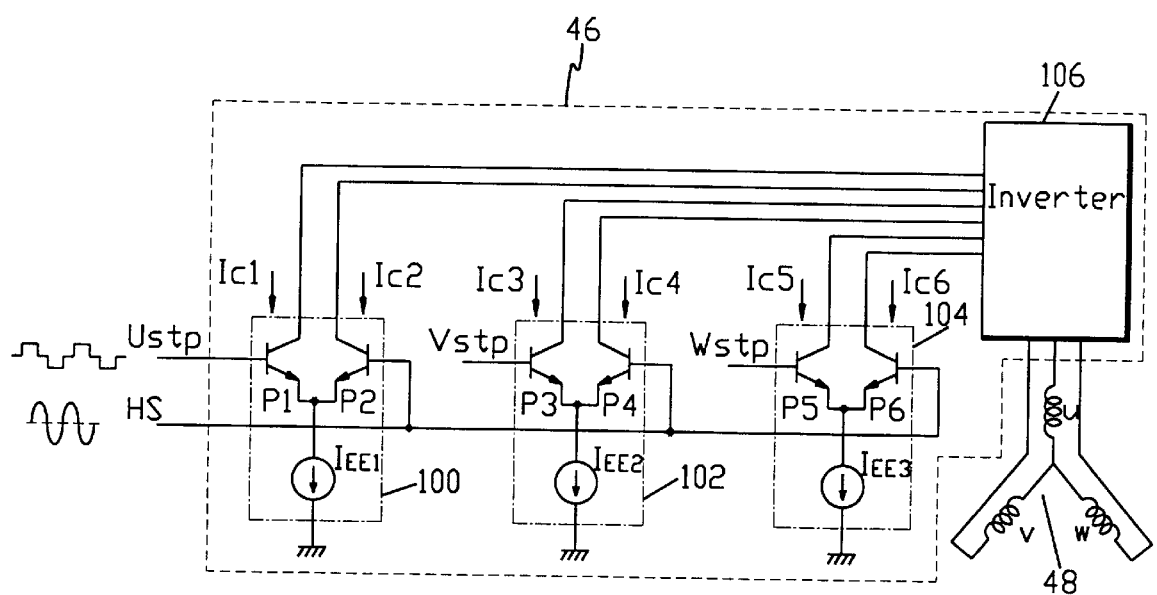
FIG. 10 is a partial circuit diagram of the commutation circuit in FIG. 4.

The first, the second, and the third step voltage signals Vstp, Ustp and Wstp are received by the commutator 46. A partial circuit diagram of the commutator 46 is shown in FIG. 10. It comprises a first, a second and a third emitter coupled pair 100, 102 and 104, and an inverter 106. The inverter 106 controls the direction of the current flow in each of the stator coils 48 by turning on and off its internal switches, which are connected to the stator coils 48, according to the amounts of the currents Ic1–Ic6 flowing through the three emitter coupled pairs 100, 102 and 104.

The currents Ic1–Ic6 flowing in the first, the second, and the third emitter coupled pairs 100, 102 and 104 vary depending on the voltage difference applied to their respective two voltage input terminals. The first, the second, and the third step voltage signals Ustp, Vstp and Wstp are applied to one of the input voltage terminals of the first, the second, and the third emitter coupled pairs 100, 102 and 104, respectively. The sub-magnet Hall signal HS is applied in common to the other input voltage terminals of the three emitter coupled pairs 100, 102 and 104.

Figure 11:
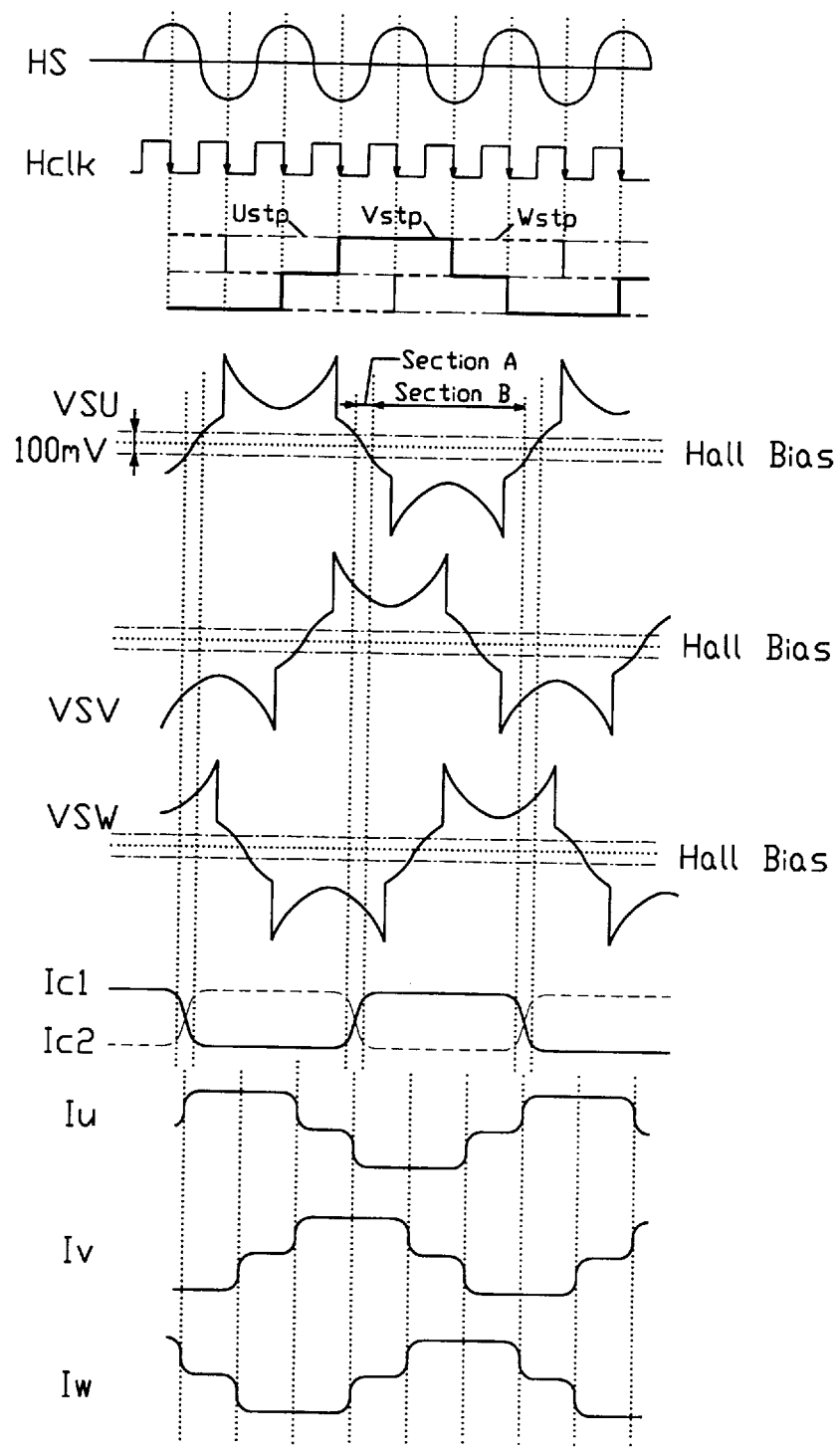
FIG. 11 shows output signals of a three-phase brushless dc driving motor according to an embodiment of the present invention.

The output signals of three-phase brushless motor driving circuits according to an embodiment of the present invention are shown in FIG. 11. A first voltage difference signal VSU is voltage difference of the sub-magnet Hall signal HS and the first step voltage signal Ustp, and a second voltage difference signal VSV is voltage difference of the sub-magnet Hall signal HS and the second step voltage signal Vstp, and a third voltage difference signal VSW is voltage difference of the sub-magnet Hall signal HS and the third step voltage signal Wstp.

These voltage difference signals VSU, VSV and VSW are clearly different in shapes than the Hall voltage difference signals VHU, VHV and VHW of the conventional three-phase brushless dc motor having three Hall sensors. Nevertheless, the voltage difference signals have six sections A in a period as in the conventional three-phase brushless dc motor. As already described, Section A is the period where the voltage difference of the sub-magnet Hall signal and the step voltage signals are within positive 50 mV and negative 50 mV of the Hall bias voltage. The section A is where currents IU, IV and IW of the stator coils 48 may be increased or decreased linearly and allow soft switching therein. Therefore, soft switching may be obtained by using one Hall signal under the present invention. This effect was obtained by using three Hall sensors in the conventional technique.

Another aspect of the present invention will now be explained. This aspect concerns circuits and methods for brushless dc motors for detecting an index marker of a motor which is used for pinpointing the starting point of motor rotation. Starting point detection may be used, for example, to read and write data without errors.

Figure 12:
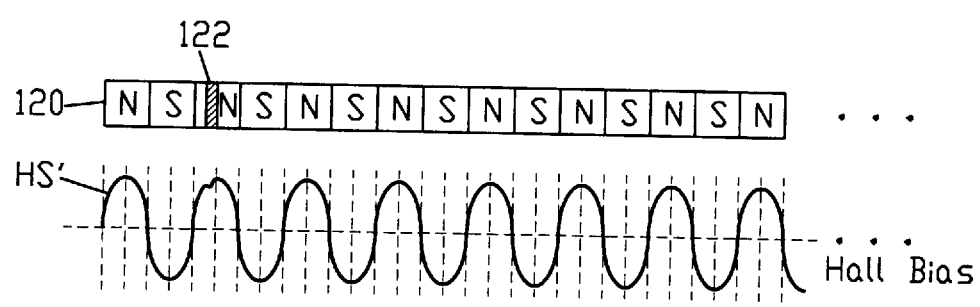
FIG. 12 shows magnetization states of the sub-magnet and the sub-magnet Hall signal.

A Hall signal HS' of a sub-magnet 120 and the magnetization state of the sub-magnet 120 are shown in FIG. 12. As shown, an N pole in the sub-magnet 120 has a slightly demagnetized portion 122 which results in a drop in magnetic field intensity at this point. The Hall signal HS' will be referred to as "sub Hall signal HS'" to distinguish it from the sub-magnet Hall signal HS discussed previously. The sub Hall signal HS' has a small depression at the point corresponding to the demagnetized portion 122. Although an N pole in the sub-magnet 120 has been partly demagnetized in this embodiment, the demagnetization may be done on a portion of a S pole for purposes of the present invention.

Figure 13:
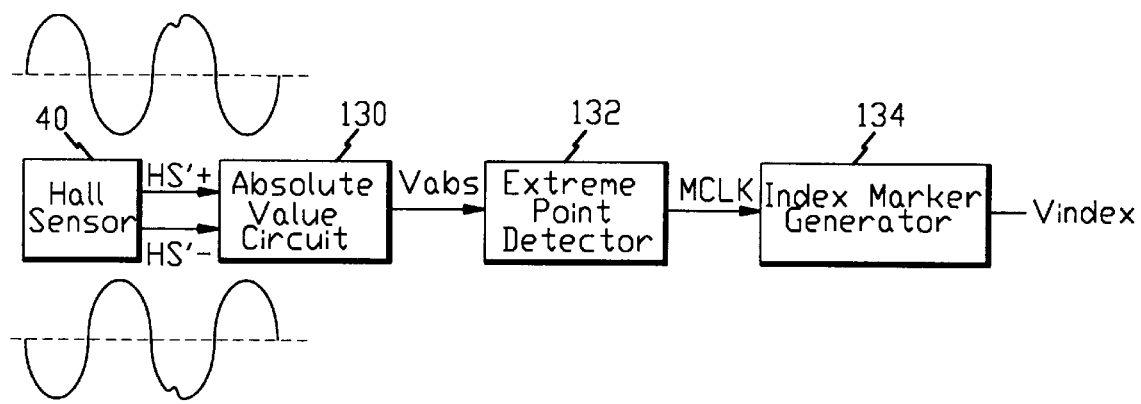
FIG. 13 is a block diagram of index marker detectors according to an embodiment of the present invention.

A block diagram of motor index signal detectors, which use the above Hall signal to generate a motor index marker is shown in FIG. 13. The motor index signal detector comprises a Hall sensor 40, an absolute value circuit 130, an extreme point detector 132, and an index marker generator 134.

Figure 14:
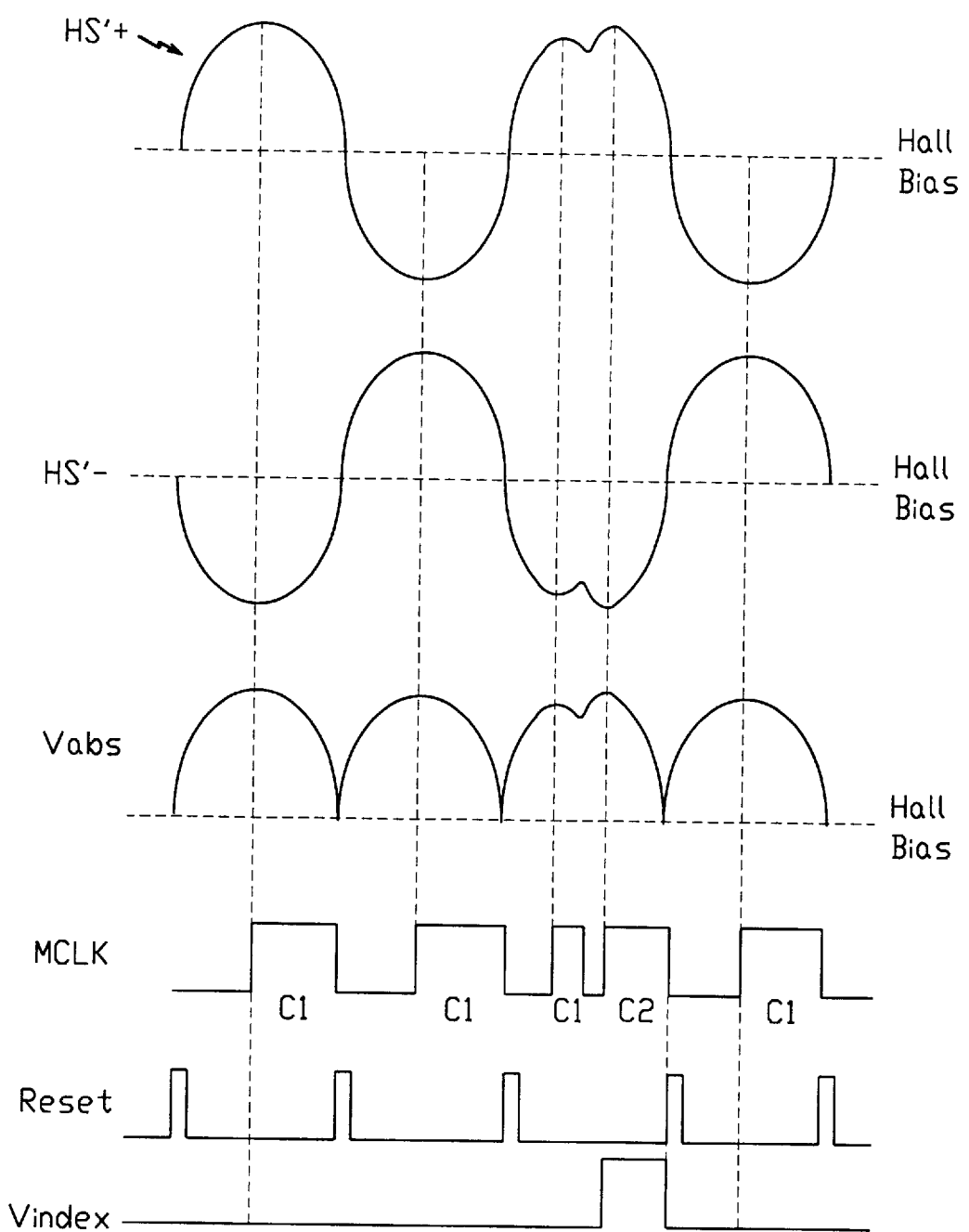
FIG. 14 shows sub Hall signals, an absolute voltage signal, a main clock signal, and an index marker.

The Hall sensor 40 outputs a positive sub-magnet Hall signal HS'+ and a negative sub-magnet Hall signal HS'–. The absolute value circuit 130 receives the positive and the negative sub-magnet Hall signals HS'+ and HS'– and combines and outputs only the positive parts of the two signals. The resulting signal is an absolute value signal Vabs which only has positive parts of the sub Hall signals with half a period length of the positive and the negative sub Hall signals HS'+ and HS'–, as shown in FIG. 14. That is, the absolute value signal Vabs corresponds to either the positive sub-magnet Hall signal HS'+ or the negative sub-magnet Hall signal HS'– that has been full rectified. It is also possible to use a Hall sensor which outputs only one of the positive or the negative sub Hall signal and use a full rectifier as the absolute value circuit 130.

The extreme point detector 132 receives the absolute value signal Vabs and generates a main clock signal MCLK which is high from a peak point to until the slope of the absolute value signal Vabs is negative and is low when the slope is positive, as shown in FIG. 14. It is also possible, however, to make the main clock to be high when the slope of the absolute value signal Vabs is positive and is low when the slope is negative.

The main clock signal MCLK comprises a first clock signal C1 and a second clock signal C2. The main clock signal MCLK includes only first clock signal C1 except for portions of the absolute value signal Vabs which has two peak points in one period, i.e., in a half period of the sub Hall signal HS', where it includes both the first and the second clock signals C1 and C2. The first clock signal C1 is used for commutation, and the second clock signal C2 is used for generating an index marker.

The structures and operations of the absolute value circuit 130 and the extreme point detector 132 are described in Korean Patent Application No. 96-55802 entitled, "Index Signal Detector Circuit of Three-Phase Brushless Motor Using One Hall Signal", the disclosure of which is hereby incorporated herein by reference. Other absolute value circuits and point detector circuits may be used.

Figure 15:
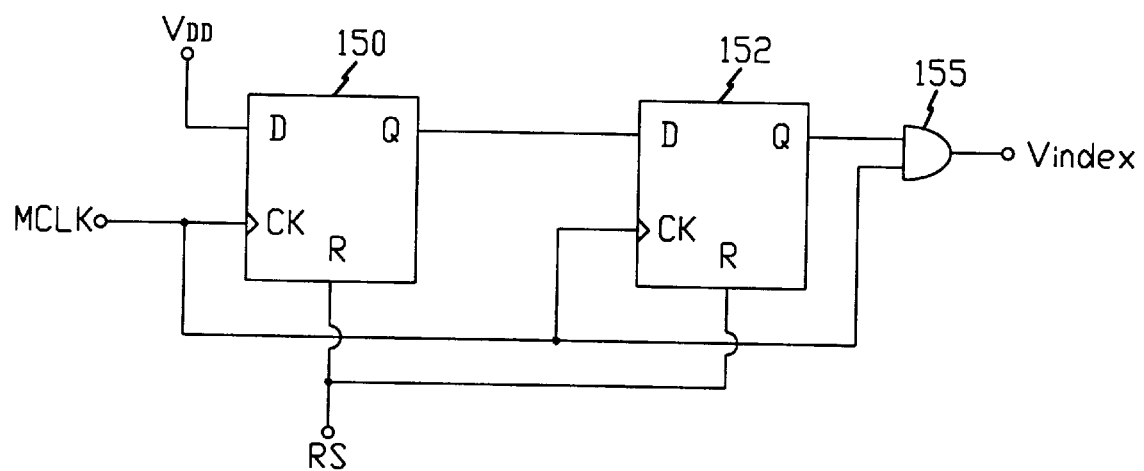
FIG. 15 is a circuit diagram of the index marker generator circuit in FIG. 13.

The index marker generator 134 receives the main clock signal MCLK from the extreme point detector 132. The index signal generator 134 comprises a first D flip-flop 150, a second D flip-flop 152 and an AND gate 154 as shown in FIG. 15. The first D flip-flop 150 receives power supply voltage VDD as an input, and the second D flip-flop 152 receives the output of the first D flip-flop 150. The main clock signal MCLK and the reset signal RS are applied in common to the clock inputs CK and the reset inputs, respectively, of both D flip-flops 150 and 152. The AND gate 154 receives the output of the second D flip-flop 152 and the main clock signal MCLK as inputs, and outputs an index marker Vindex.

A short pulse reset signal RS is sent out at the beginning of every period of the main clock signal MCLK, as shown in FIG. 14, so there is no output for the second D flip-flop 152 when the main clock signal consists of only the first clock signal C1. The input applied to the first D flip-flop 150 is outputted to the second D flip-flop 152 when the main clock signal MCLK is applied, but the second D flip-flop 152 is reset before the next main clock signal MCLK could be applied to the second D flip-flop 152.

On the other hand, when the main clock signal includes both first and second clock signals C1 and C2, the second D flip-flop produces an output to the AND gate 154 since there are two clock cycles in the main clock signal MCLK. The AND gate 154 in turn outputs the index marker Vindex.

Figure 16:
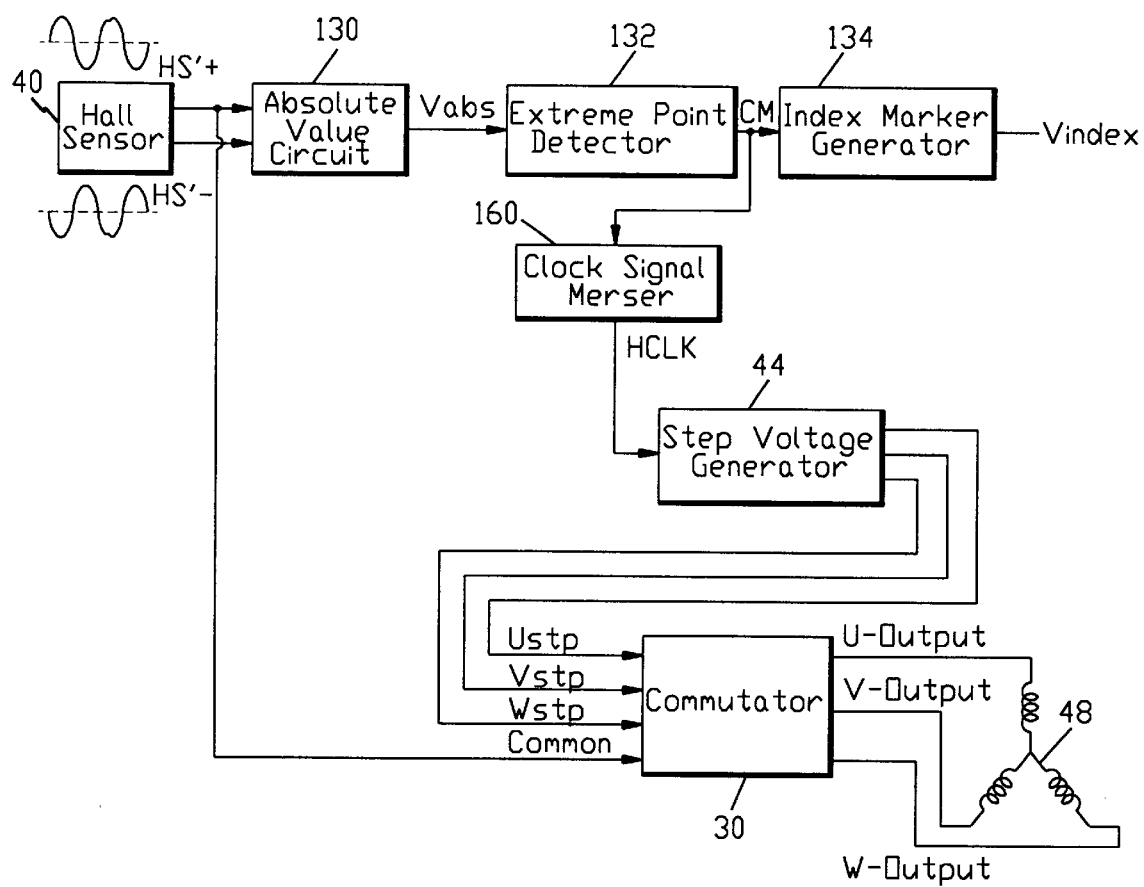
FIG. 16 is a block diagram of a three-phase brushless dc motor using one Hall signal, having capability of detecting an index marker, according to an embodiment of the present invention.

A block diagram of a three-phase brushless dc motor driving circuit having index marker detecting capability according to an embodiment of the present invention is shown in FIG. 16.

The three-phase brushless dc motor driving circuit having index signal detection capability includes a Hall sensor 40 for detecting and outputting a positive and a negative sub Hall signals HS'+ and HS'–. An absolute value circuit 130 receives the positive and the negative sub Hall signals HS'+ and HS'– and generates an absolute value signal Vabs. An extreme point detector 132 generates a main clock signal MCLK, having a first clock signal C1 and a second clock signal C2, based on the peak points of the absolute value signal Vabs. An index marker generator 134 which generates an index marker Vindex by using the main clock signal MCLK. A clock signal merger 160 which receives the main clock signal MCLK and merges the second clock signal C2 into the first clock signal C1 and generates a merged clock signal HCLK. A step voltage signal generator 44 receives the merged clock signal HCLK and generates three step voltage signals Ustp, Vstp and Wstp with the period three times that of the sub Hall signal and with 120 and 240 degree phase difference respectively with the other two step voltage signals. A commutator 46 controls the current directions in the stator coils 48.

As described above, three-phase brushless motor circuits and methods having index marker detection capability according to an embodiment of the present invention allow for reduced circuit size and cost by allowing soft switching using only one Hall sensor instead of three as under the conventional technique. Index marker detection may also be provided by using a circuit instead of numerous mechanical elements.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A three-phase brushless dc motor driving circuit for a three-phase brushless dc motor including a rotor with a first magnet having alternating magnetic poles and a stator having three phase coils, the three-phase brushless dc motor driving circuit comprising:

a Hall sensor which generates a sinuoidal Hall signal based on the magnetic field strength of the first magnet;

an extreme point detector which generates an extreme point signal based on extreme points of the sinuoidal Hall signal;

a step voltage generator which generates a first, a second and a third step voltage signal based on the extreme point signal, each step voltage signal having a signal period which is three times the sinuoidal period of the sinuiodal Hall signal and having 120 and 240 degree phase differences with the other two step voltage signals, respectively; and a commutator which controls a current direction in each of the stator coils based on the voltage differences between each of the three step voltage signals and the sinuoidal Hall signal, respectively.

2. A three-phase brushless dc motor driving circuit according to claim 1, wherein the rotor has a second magnet having alternating magnetic poles and wherein the ratio of magnetic polarity of the first magnet to the second magnet is 3 to 1, whereby the first magnet is used for controlling motor rotation speed and the second magnet is used for generating torque for motor rotation.

3. A three-phase brushless dc motor driving circuit according to claim 1, wherein the commutator comprises:

first, second and third emitter coupled pairs which receive the first, the second and the third step voltage signals, respectively, and which all receive the sinuoidal Hall signal, each of the emitter coupled pairs varying the current flow therethrough based on the voltage differences of the respective step voltage signals and the sinuoidal Hall signal; and an inverter which controls the direction of current flow in each of the stator coils based on the current flowing through the output terminals of the emitter coupled pairs.

4. A three-phase brushless dc motor driving circuit according to claim 1, wherein the step voltage generator comprises:

a switch signal generator which produces a first signal pair having two signals with 180 degree phase difference therebetween, and a second signal pair having two signals with 180 degree phase difference therebetween and having 120 degree phase difference respectively between the two signals of the first signal pair, and a third signal pair having two signals with 180 degree phase difference therebetween and each having 120 degree phase difference between the corresponding signals in the first and the second signal pairs; and switching means for generating the first, the second and the third step voltage signals based on the first, the second and the third signal pairs, each step voltage signal having standard voltage level, above-standard voltage level and below-standard voltage level.

5. A three-phase brushless dc motor driving circuit according to claim 4, wherein each of the first, the second and the third signal pairs maintains a first level and a second level for four periods and for two periods, respectively, of the extreme point signal.

6. A three-phase brushless dc motor driving circuit according to claim 1, wherein each of the step voltage signals maintains above-standard voltage level for a first two periods of the extreme point signal, standard voltage level for a next one period of the extreme point signal, below-standard voltage level for a next two periods of the extreme point signal, and the standard voltage level for a next one period of the extreme point signal.

7. A three-phase brushless dc motor driving circuit according to claim 4, wherein the switching means comprises:

first, second and third flip-flops, all of which receive the extreme point signal; a first to a fourth inverter; and a first to an eighth logic gate;

wherein the second flip-flop receives an inverse output of the first flip-flop, and the third flip-flop receives an output of the second flip-flop;

wherein the first logic gate NANDs the inverse outputs of the first and the second flip-flops, and the second logic gate NANDs the outputs of the first logic gate and the third flip-flop, and the output of the second logic gate is received by the first inverter, and the output of the first inverter is received by the first flip-flop;

wherein the output of the third flip-flop and the inverse outputs of the second and the first flip-flops produce a first, a second and a third phase clock signal, respectively;

wherein the second, the third and the fourth inverter invert the output of the first, the second and the third phase clock signal, respectively;

wherein the third logic gate generates one of the two signals of the first signal pair by receiving and NANDing the first phase clock signal and the output of the third inverter, and the fourth logic gate generates the other signal of the first signal pair by receiving the second phase clock signal and the output of the second inverter;

wherein the fifth logic gate generates one of the two signals of the second signal pair by receiving and NANDing the second phase clock signal and the output of the fourth inverter, and the sixth logic gate generates the other signal of the second signal pair by receiving the third phase clock signal and the output of the third inverter; and wherein the seventh logic gate generates one of the two signals of the third signal pair by receiving and NANDing the third phase clock signal and the output of the second inverter, and the eighth logic gate generates the other signal of the third signal pair by receiving the first phase clock signal and the output of the fourth inverter.

8. A three-phase brushless dc motor driving circuit according to claim 5, wherein each of the step voltage signals maintains above-standard voltage level for a first two periods of the extreme point signal, standard voltage level for a next one period of the extreme point signal, below-standard voltage level for a next two periods of the extreme point signal, and the standard voltage level for a next one period of the extreme point signal.

9. A three-phase brushless dc motor driving circuit according to claim 8, wherein the switching means comprises:

first, second and third flip-flops all of which receive the extreme point signal; a first to a fourth inverter; and a first to an eighth logic gate;

wherein the second flip-flop receives an inverse output of the first flip-flop, and the third flip-flop receives an output of the second flip-flop;

wherein the first logic gate NANDs the inverse outputs of the first and the second flip-flops, and the second logic gate NANDs the outputs of the first logic gate and the third flip-flop, and the output of the second logic gate is received by the first inverter, and the output of the first inverter is received by the first flip-flop;

wherein the output of the third flip-flop and the inverse outputs of the second and the first flip-flops produce a first, a second and a third phase clock signal, respectively;

wherein the second, the third and the fourth inverter invert the output of the first, the second and the third phase clock signal, respectively;

wherein the third logic gate generates one of the two signals of the first signal pair by receiving and NANDing the first phase clock signal and the output of the third inverter, and the fourth logic gate generates the other signal of the first signal pair by receiving the second phase clock signal and the output of the second inverter;

wherein the fifth logic gate generates one of the two signals of the second signal pair by receiving and NANDing the second phase clock signal and the output of the fourth inverter, and the sixth logic gate generates the other signal of the second signal pair by receiving the third phase clock signal and the output of the third inverter; and wherein the seventh logic gate generates one of the two signals of the third signal pair by receiving and NANDing the third phase clock signal and the output of the second inverter, and the eighth logic gate generates the other signal of the third signal pair by receiving the first phase clock signal and the output of the fourth inverter.

10. A three-phase brushless dc motor driving circuit according to claim 5, wherein the switching means comprises a first switch, a second switch and a third switch receiving the first, the second and the third signal pairs, respectively.

11. A three-phase brushless dc motor driving circuit according to claim 10, wherein each of the first, second and third switches comprises:
two resisters connected in series between a voltage source and ground;
two current sources, each connected in parallel to one of the two resisters; and
means for turning on one or turning off both of the current sources based on the states of the signal pairs.

12. A three-phase brushless dc motor driving circuit according to claim 5, wherein the switching means includes a first, a second and a third switch for receiving the first, the second and the third signal pairs, respectively.

13. A three-phase brushless dc motor driving circuit according to claim 12, wherein each of the three switching means comprises:
a first and a second current source connected to a voltage source and the ground, respectively;
a first and a second resistor connected in series between the voltage source and the ground; and
a switch which is shorted to either the first or the second current source or opened depending on the state of the signal pairs, and which has an output terminal connected to a point between the first and the second resistors.

14. A three-phase brushless dc motor driving circuit according to claim 13, wherein the first and the second resistors have identical resistance.

15. A three-phase brushless dc motor driving circuit according to claim 4, wherein the standard voltage is the sinusoidal Hall bias voltage of the Hall signal.

16. A three-phase brushless dc motor driving circuit according to claim 1 in combination with a three-phase brushless dc motor including a rotor with a first magnet having alternating magnetic poles and a stator having three phase coils.

17. An index marker detector circuit for a three-phase brushless dc motor including a rotor with a magnet which has a demagnetized portion, comprising:
a Hall sensor which generates a Hall signal according to the magnetic field strength of the magnet;
an absolute value circuit which generates an absolute value signal of the Hall signal;
an extreme point detector which outputs an extreme point signal based on extreme points of the absolute value signal; and
an index marker generator which generates an index marker at a point where the extreme point signal is output twice within a half period of the Hall signal in order to indicate the starting point of motor rotation.

18. An index marker detector circuit for a polyphase brushless dc motor according to claim 17, wherein the index marker generator comprises:
a first D flip-flip which receives a high level voltage source as a data input and a reset signal which is generated every half a period of the Hall signal as a reset input and the extreme point signal as a clock input;

a second D flip-flop which receives the output of the first D flip-flop and receives the reset signal as a reset input and the extreme point signal as a clock input; and
a logic gate which ANDs the output of the second D flip-flop and the extreme point signal.

19. An index marker detector circuit for a three-phase brushless dc motor according to claim 18, wherein the reset signal is generated when the Hall signal is identical to the Hall bias voltage.

20. An index marker detector circuit according to claim 17 in combination with a three-phase brushless dc motor including a rotor with a magnet which has a demagnetized portion.

21. A three-phase brushless dc motor drive circuit for a three-phase brushless dc motor having a rotor with a magnet which has a demagnetized portion, the three-phase brushless dc motor driving circuit comprising:
a Hall sensor which generates a Hall signal according to the magnetic field strength of the magnet;
an absolute value circuit which receives the Hall signal and outputs an absolute value signal thereof;
an extreme point detector which generates an extreme point signal based on extreme points of the absolute value signal;
an index marker generator which generates an index marker at points where the extreme point signal is output twice in a half period of the Hall signal to indicate a starting point of the motor rotation;
a clock signal merger which receives the extreme point signal and generates a clock signal for only the extreme points of the Hall signal;
a step voltage generator which receives the clock signal and generates three step voltage signals which have signal period three times that of the Hall signal, each step voltage signal having 120 and 240 degree phase difference with the other two step voltage signals; and
a commutator which controls directions of currents in each of the stator coils by utilizing the voltage differences between each of the three step voltage signals and the Hall signal, respectively.

22. A three-phase brushless dc motor drive circuit according to claim 21 in combination with a three-phase brushless dc motor having a rotor with a magnet which has a demagnetized portion.

23. A three-phase brushless dc motor driving circuit for a three-phase brushless dc motor including a rotor with a first magnet having alternating magnetic poles and a stator having three phase coils, the three-phase brushless dc motor driving circuit comprising:
a sinusoidal Hall sensor which generates a Hall signal based on the magnetic field strength of the first magnet;
an extreme point detector which generates an extreme point signal based on extreme points of the sinusoidal Hall signal; and
a controller which controls a current direction in each of the stator coils based on the extreme point signal.

24. A three-phase brushless dc motor driving circuit according to claim 23 in combination with a three-phase brushless dc motor including a rotor with a first magnet having alternating magnetic poles and a stator having three phase coils.

25. A three-phase brushless dc motor driving method for a three-phase brushless dc motor including a rotor with a first magnet having alternating magnetic poles and a stator having three-phase coils, the method comprising the steps of:

generating a Hall signal based on the magnetic field strength of the first magnet;

generating an extreme point signal based on extreme points of the Hall signal;

generating a first, a second and a third step voltage signal based on the extreme point signal, each step voltage signal having a signal period which is three times the period of the Hall signal and having 120 and 240 degree phase differences with the other two step voltage signals, respectively; and controlling a current direction in each of the stator coils based on the voltage differences between each of the three step voltage signals and the Hall signal, respectively.

26. A three-phase brushless dc motor driving method according to claim 25, wherein the step voltage generating step comprises the steps of:

producing a first signal pair having two signals with 180 degree phase difference therebetween, and a second signal pair having two signals with 180 degree phase difference therebetween and having 120 degree phase difference respectively between the two signals of the first signal pair, and a third signal pair having two signals with 180 degree phase difference therebetween and each having 120 degree phase difference between the corresponding signals in the first and the second signal pairs; and generating the first, second and third step voltage signals based on the first, the second and the third signal pairs, each step voltage signal having standard voltage level, above-standard voltage level and below-standard voltage level.

27. An index marker detecting method for a three-phase brushless dc motor including a rotor with a magnet which as a demagnetized portion, the index marker detecting method comprising the steps of:

generating a Hall signal according to the magnetic field strength of the magnet;

generating an absolute value signal of the Hall signal;

outputting an extreme point signal based on extreme points of the absolute value signal; and generating an index marker at a point where the extreme point signal is output twice within a half period of the Hall signal in order to indicate a starting point of motor rotation.

28. A three-phase brushless dc motor driving method having index signal detection capability, for a three-phase brushless dc motor having a rotor with a magnet which has a demagnetized portion, the driving method comprising the steps of:

generating a Hall signal according to the magnetic field strength of the magnet;

receiving the Hall signal and outputting an absolute value signal thereof;

generating an extreme point signal based on extreme points of the absolute value signal;

generating an index marker at points where the extreme point signal is outputted twice in a half period of the Hall signal to indicate a starting point of the motor rotation;

receiving the extreme point signal and generating a clock signal for only the extreme points of the Hall signal;

receiving the clock signal and generating three step voltage signals which have signal period three times that of the Hall signal, each step voltage signal having 120 and 240 degree phase difference with the other two step voltage signals; and controlling directions of currents in each of the stator coils by utilizing the voltage differences between each of the three step voltage signals and the Hall signal, respectively.

* * * * *